(12) United States Patent
Broyles

(10) Patent No.: US 10,290,150 B1
(45) Date of Patent: May 14, 2019

(54) COMPRESSING SPATIAL DATA

(71) Applicant: SPRINT COMMUNICATIONS COMPANY L.P., Overland Park, KS (US)

(72) Inventor: Daniel Stewart Broyles, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 39 days.

(21) Appl. No.: 14/989,794

(22) Filed: Jan. 7, 2016

(51) Int. Cl.
| | |
|---|---|
| *G06T 17/05* | (2011.01) |
| *G06T 7/60* | (2017.01) |
| *G06T 11/20* | (2006.01) |
| *G06T 9/20* | (2006.01) |

(52) U.S. Cl.
CPC ............... *G06T 17/05* (2013.01); *G06T 7/60* (2013.01); *G06T 9/20* (2013.01); *G06T 11/203* (2013.01); *G06T 2200/24* (2013.01); *G06T 2207/30184* (2013.01); *G06T 2215/16* (2013.01)

(58) Field of Classification Search
CPC ............................ G06T 11/206; G01C 21/367
See application file for complete search history.

(56) References Cited

U.S. PATENT DOCUMENTS

| | | | | |
|---|---|---|---|---|
| 8,872,848 B1* | 10/2014 | Appleton | .............. | G06T 11/206 345/629 |
| 2014/0188386 A1* | 7/2014 | Obara | .................... | G01C 21/32 701/532 |

OTHER PUBLICATIONS

MapInfo Professional 10.5 User Guide, Jun. 2010, Pitney Bowes, pp. 1-525.*
Engage Version 7.0 User Guide, Sep. 2011, Pitney Bowes, pp. 1-612.*
MapInfo Discover 2015 User Guide, Jul. 2015, Pitney Bowes, pp. 1-1248.*
Techniques for reducing a MapInfo TAB's file size without losing too much integrity?, Jul. 2015, Geographic Information Systems Stack Exchange, downloaded on May 11, 2017, 1 page.*
Techniques for reducing a MapInfo TAB's file size without losing too much integrity?, Sep. 2015, Geographic Information Systems Stack Exchange, Internet Archive Wayback Machine, downloaded on May 11, 2017, 1 page.*
Krzanowski, Roman M., "Compression of Spatial Data", Proceedings of the International Symposium on Computer-Assisted Cartography, Feb. 27-29, 1995, Charlotte, North Carolina, 10 pages. Available at: http://mapcontext.com/autocarto/proceedings/autocarto-12/pdf/compression-of-spatial-data.pdf.

* cited by examiner

*Primary Examiner* — Jeffery A Brier

(57) ABSTRACT

Systems and methods are provided for analyzing, processing, and generating maps, such as maps representing license territories for radio frequency spectrum as used in wireless communications, or other spatial data. Maps and other spatial data are maintained as spatial data files and the analysis, processing, and generation of these files may be accomplished through reducing the number of spatial data points in the spatial data file. A candidate point be may selected for elimination if it is found to be within a threshold separation distance of a reference point. Further a candidate point may be selected for eliminated if it is within a collinear variance distance of a reference point and a third point in series. Candidate points which are not selected for elimination are retained and used to generate a new spatial data file representing a new license territory map.

18 Claims, 6 Drawing Sheets

US 10,290,150 B1

COMPRESSING SPATIAL DATA

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In wireless communications, bands of the radio frequency spectrum that carry wireless communication are apportioned and licensed by geographic territories. Data relating to the boundaries of these territories can come from a large number of sources and can take many different forms. The spatial data files, which contain this data, are often developed as composite maps of separate source files representing geographical maps of different regions and often contain much greater detail than necessary for their present purpose. Embodiments of the disclosure are defined by the claims below but, summarily, embodiments of the disclosure reduce file size and processor time associated with storing and analyzing spatial data, such as map files. A method and system using computer-readable media provide, among other things, reduced spatial data file size and an accompanying reduction in processor load while analyzing and processing spatial data files. By reducing the number of spatial data points in the spatial data file, the embodiments of the disclosure thereby solve problems associated with the current art of cartographic data management.

BRIEF DESCRIPTION OF THE DRAWINGS

Embodiments of the disclosure is described in detail below with reference to the attached drawings figures, wherein.

DETAILED DESCRIPTION

Figure 1:
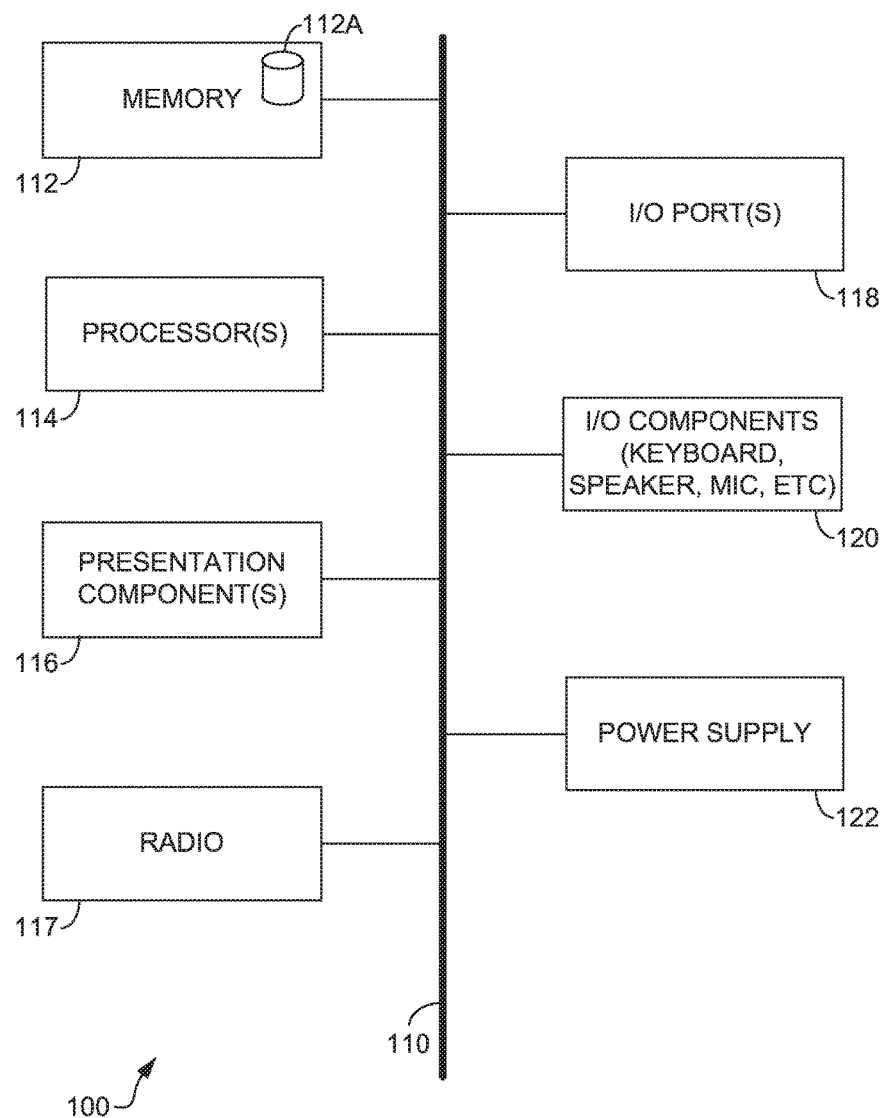
FIG. 1 depicts a block diagram of an exemplary computing device according to an embodiment of the disclosure.

The subject matter of the disclosure is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different components of the methods employed, the terms should not be interpreted as implying any particular order among or between various steps herein disclosed unless and except when the order of individual steps is explicitly described.

Embodiments of the disclosure may be embodied as, among other things, a method, system, or computer-program product. Accordingly, the embodiments may take the form of a hardware embodiment, or an embodiment combining software and hardware. One embodiment of the disclosure takes the form of a computer-program product that includes computer-usable instructions embodied on one or more computer-readable media.

Computer-readable media include both volatile and non-volatile media, removable and non-removable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-readable media include media implemented in any method or technology for storing information. Examples of stored information include computer-useable instructions, data structures, program modules, and other data representations. Computer-readable media include, but are not limited to RAM, ROM, EEEPROCM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

As described above, bands of the radio frequency spectrum that carry wireless communication are apportioned and licensed by geographic territories. Portions of the 800 MHz, and 1.9 and 2.5 GHz bands are allocated by license territories, the areas of which may be related to political boundaries, such as state or county lines, a circular area centered around a particular set of geographical coordinates, or they may be based on a signal propagation model. Wireless service providers generally hold a large number of individual licenses. Data relating to the boundaries of license territories can come from a large number of sources and can take many different forms.

The spatial data files, which contain this data, may be developed as composite maps of separate source files representing geographical maps of different regions. These files contain depictions of map features often comprised of polygons of spatial data readable by geographic information system (GIS) software, such as MapInfo. Though polygons are the most common feature class used to depict map features, map features can also comprise, for example, rings, curves segments, or sequences of points. In many instances, the map features have much greater detail than necessary for their present purpose. For example, this might occur where a spatial data file was first developed for presentation on a 1:10,000 scale (e.g. on the scale of a neighborhood) but is now being used in a composite map on a 1:1,000,000 scale (e.g. on the scale of the continental United States.) Moreover, the source data may have required editing from its original form, further adding to the complexity of the map features and increasing the level of detail. For instance, due to conflicts in licenses that are not reflected in the source file data, such as overlapping license regions, the source data may need to be edited to divide the conflicting regions.

Consequently, a relatively large amount of map source data can represent a relatively small geographical region. This results in large files, which require large amounts of disk space for storage, excessive processor time for analysis, and greater time and bandwidth to transfer across a network.

Accordingly, developers who create applications that analyze spatial data files are constantly forced to address issues relating to the size of the data and the time required in processing the files. It quickly becomes unwieldy to manage this data, particularly when updates to the data files occur on a regular basis, such as weekly or even daily.

Some methods of reducing file size while maintaining a high level of detail involve implementing a compression algorithm. While lossless compression is useful to limit the disk space occupied by map data, lossless compression does not improve the processing time of applications that analyze such map data. In fact, lossless compression generally requires decompression before it can be processed, effectively increasing the processing time over the uncompressed source data.

Embodiments of the disclosure may reduce file size and processor time associated with storing and analyzing spatial data, such as map files. A method and system using computer-readable media provide, among other things, reduced spatial data file size and an accompanying reduction in processor load while analyzing and processing spatial data files. By reducing the number of spatial data points in the spatial data file, the embodiments of the disclosure thereby solve problems associated with the current art of cartographic data management.

At a high level, map generalization is a process by which the amount of map information is reduced. The amount of information retained in a map is typically determined based on the amount of detail which can meaningfully be shown or analyzed on a given scale of display. By eliminating points from the data set, the size of the data set will be reduced; however, details of the features represented may be obscured. To overcome this problem, some embodiments of the disclosure remove only spatial data points which do not significantly contribute to the feature of the map.

Embodiments of the disclosure relate to the generalization of spatial data to allow for faster processing of map data and smaller storage files. For example, given an input map comprising an initial set of spatial points, an embodiment of a generalization method is provided that eliminates spatial point data that does not contribute meaningfully to the details of features represented in the input map. In one embodiment, the generalization method returns an output map that comprises a set of retained spatial points. A set of retained spatial points can be generated by eliminating points located within the threshold separation distance and the threshold collinear variance distance as measured from a reference point. The points retained in this way are likely significant to the features of the map data. The output map contains fewer data points than the input map, but retains the points necessary to describe all of the features of the input map.

Embodiments of the disclosure have several practical applications in the technical arts including reducing the data storage space required to store spatial data files, reducing bandwidth requirements for transmitting spatial data files across a network, and allowing for more flexibility in the type of analysis which can reasonably be applied to spatial data by reducing the processor time required. This is done through systems and methods, implemented alone or in combination, which remove selected spatial data points present in the source map data. One embodiment of the disclosure eliminates points which fall proximate to a straight line between serial points which define the boundaries of a map feature. In another illustrative embodiment of the disclosure eliminates points which fall within a threshold, radial distance of a reference point.

Moreover, as opposed to lossless compression techniques, embodiments for generalization of map data may result in a reduced set of data points describing the map features. Accordingly, not only is file size reduced, which increases storage and network transfer efficiency, but processing the generalized data is more efficient and requires less time. Further, the benefit of the reduction in processor time for an output map is a function of the processor time for the file prior to generalization. Thus, for example, by reducing a file size by half, often the processing time can be reduced by much more than half.

Some embodiments of this process are further distinguishable from lossless compression methods in that the content format of the output file may be the same format as the input file. For example, if the content format of input file is a MapInfo file, the output file would likewise be a MapInfo file. This eliminates the need to decompress the output file before using the data. Accordingly, some embodiments of the disclosure include a computerized method which results in the generalization of the spatial data which can be processed by the same software as the map source data without requiring decompression or additional processing.

In some embodiments of the disclosure, map data stored as a sequence of points is generalized by identifying a series of three points and eliminating a candidate point in the series of three points if it is within a threshold separation distance from a reference point or if the candidate point is within a threshold collinear variance distance from a line connecting the reference point and a third point in the series. In particular, the threshold separation distance may be a radial distance centered at the reference point and the threshold collinear variance distance may be a distance measured perpendicular to the line between the reference point and the third point.

Accordingly, the degree of generalization, and therefore the reduction in file size, may be dependent on the particular threshold collinear distance and/or the threshold separation distance that is used. In some embodiments the threshold covariance distance and the threshold separation distance are the same quantity. In one embodiment, a threshold covariance distance and a threshold separation distance of 0.025 miles results in a greater than ninety percent (90%) reduction in file size.

In some embodiments, threshold separation distance and threshold collinear variance distance may be determined based on resolution requirements or an error tolerance and may be determined from the outset. The use of these constants results in a generalized output map which will not be further generalized if passed through the generalization method a second time using the same constants.

In one aspect, an embodiment of the disclosure is directed to a method of generalizing map data. The method may be carried out by one or more computing devices, such as described in connection to FIG. 1. The first step of the method is to receive map source data representing a first map in a content format. Next, a first set of spatial points is determined from the map source data. Then, a second set of spatial points is generated from this first set through an iterative process.

The iterative process comprises a series of steps. Initially, a series of three points from the first set of spatial points is identified. The series of three points comprises a reference point, a candidate point, and a third point. Next, the candidate point is eliminated if it is less than a threshold separation distance from the reference point or less than a threshold collinear variance distance from a line connecting the reference point with the third point. Otherwise, if the candidate point is not less than the threshold separation distance from the reference point and not less than the collinear variance distance from the line connecting the reference point and the third point, the candidate point is retained. This iterative process may be repeated until each point in the data file has been evaluated. Once the second set of spatial points is generated, a second map is determined from the second set of points. This second map is then provided as an output map.

In another aspect, an embodiment of the disclosure is direct to one or more computer-readable media having computer-executable instructions embodied thereon that, when executed, facilitates a method of generating a set of retained spatial points. The method includes identifying a first segment for a feature in a first map. The first segment comprises a reference point, a candidate point and a third point in a series. Further, the method includes evaluating the candidate point to determine whether the candidate point is more than a threshold separation distance away from the reference point and more than a threshold collinear variance distance away from a line between the reference point and the third point. The method further includes retaining the candidate point that is more than the threshold separation distance away from the reference point and more than the threshold collinear variance distance away from the line between the reference point and the third point. In some embodiments, the method also includes retaining the third point of the first segment.

Yet another embodiment of the disclosure is directed to a computerized system. The system includes a data store which stores map source data and a user interface. The system further includes a map generalization component configured to receive a first map and to generate a second map comprising a set of retained spatial points. The set of retained spatial points is determined by selecting a reference point and eliminating candidate spatial points found to be within a given tolerance of the reference point. The given tolerance may be determined based on a threshold separation distance and a collinear variance distance.

Some embodiments of the disclosure operate on the point level, requiring map features stored in different feature classes, such as polygons, rings and curve segments, to be converted to points. In such embodiments, this may be accomplished by a data converter, which decomposes a polygon in a ring, a ring into a curve segment, and then a curve segment to its constituent points.

Embodiments of the generalization process may be carried out in a single pass of the data without a need to analyze the data set in advance. As a result, the generalization processing can be performed in O(n) time. In some embodiments, the generalization of spatial data can be accomplished in real time or near real time as a user request is being submitted.

Having briefly described embodiments of the disclosure, an operating environment suitable for use in implementing embodiments of the disclosure is describe below. Referring to the drawings in general, and initially to FIG. 1 in particular, a block diagram of an exemplary computing device according to one embodiment is provided and reference generally by the numeral 100. Although some components are shown in the singular, they may be plural. For example, the user device 100 might include multiple processors or multiple radios, etc. As illustratively shown, the user device 100 includes a system bus 110 that directly or indirectly couples various components together, including memory 112, a processor 114, a presentation component 116, a radio 117 (if applicable), input/output (I/O) ports 118, I/O components 120, and a power supply 122.

The system bus 110 of the user device 100 may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronic Standard Association (VESA) local bus, and Peripheral Component Interconnection (PCI) bus, also known as Mezzanine bus.

Memory 112 might take the form of memory components such as the computer-readable media previously described. Thus, further elaboration will not be provided here, only to say that the memory component 112 can include any type of medium that is capable of storing information (e.g., a data store). A data store can be any collection of records. In one embodiment, memory 112 include a set of embodied computer-executable instructions 112A that, when executed, facilitate various aspects disclosed herein. Theses embodied instructions will variously be referred to as "instructions" or an "application" for short.

Figure 2A:
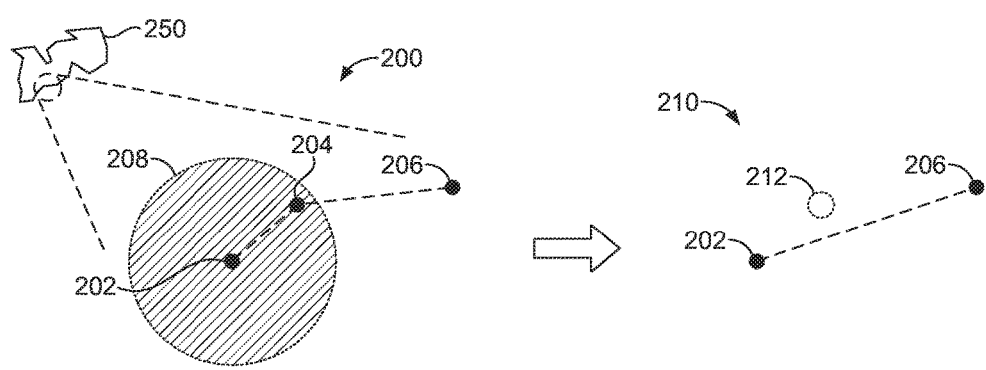
FIGS. 2A and 2B depict exemplary illustrations of a method of evaluating a candidate point for retention or elimination based on a threshold separation distance, in accordance with an embodiment of the disclosure.
Figure 2B:
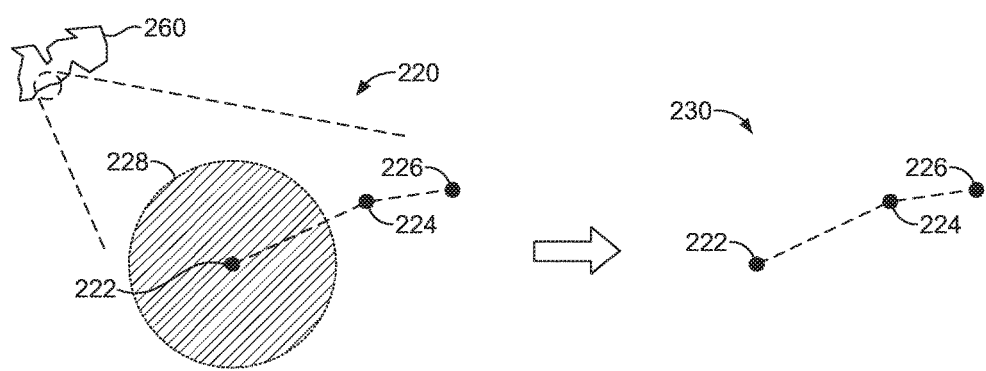

Turning now to FIGS. 2A and 2B, exemplary illustrations are provided depicting aspects of a method for evaluating a candidate point for retention or elimination based on a threshold separation distance, in accordance with an embodiment of the disclosure. In particular, FIGS. 2A and 2B show examples of performing one embodiment of a threshold separation operation on two different segments of map features consisting of three serial points. Turning first to FIG. 2A, an aspect of the disclosure is applied to a segment of map feature 250. Here, map feature 250 takes the form of an irregular polygon made up of discrete spatial data points in an ordered sequence. Aspects of the disclosure can also be applied to map features existing in various features classes, including, but not limited to, polygons as rings, curve segments, lines and points.

In the initial condition 200, the segment consists of a reference point 202, a candidate point 204, and a third point 206. The candidate point 204 is within the threshold separation distance 208 of the reference point 202. As a result, in the final condition 210 the candidate point is eliminated 212, while the reference point 202 and the third point 206 are retained. In some embodiments, a plurality of potential candidate points may be eliminated in this way, for being within the separation distance from the reference point, before a candidate point which is not within the threshold separation distance.

Turning now to FIG. 2B, we find a map feature 260, analogous to map feature 250 in FIG. 2A, but containing a segment with points configured differently than the segment described in FIG. 2A. Specifically, in the initial condition 220, the candidate point 224 is outside of the threshold separation distance 228 of the reference point 222. Therefore, in the final condition 230, no points are eliminated and the reference point 222, the candidate point 224, and the third point 226 are retained.

Figure 3A:
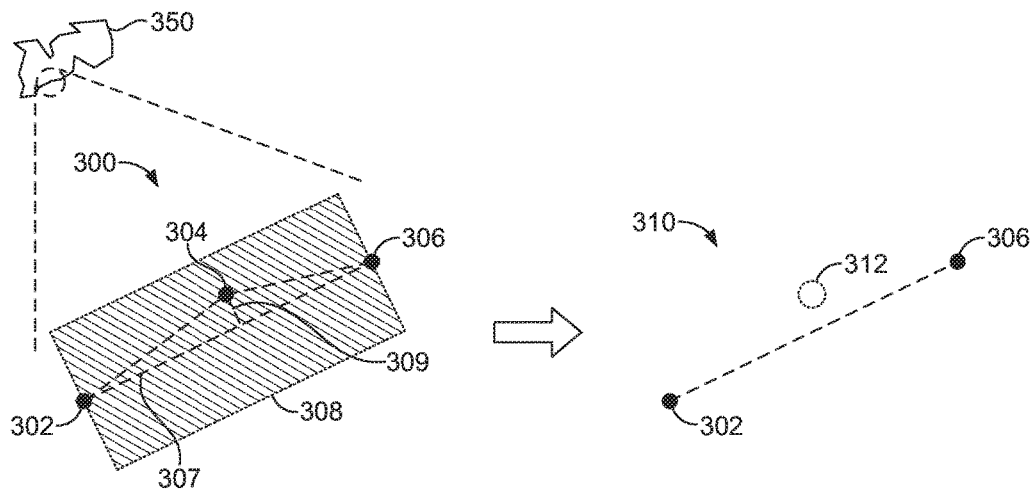
FIGS. 3A and 3B depict exemplary illustrations of a method of evaluating a candidate point for retention or elimination based on a threshold collinear variance distance, in accordance with an embodiment of the disclosure.
Figure 3B:
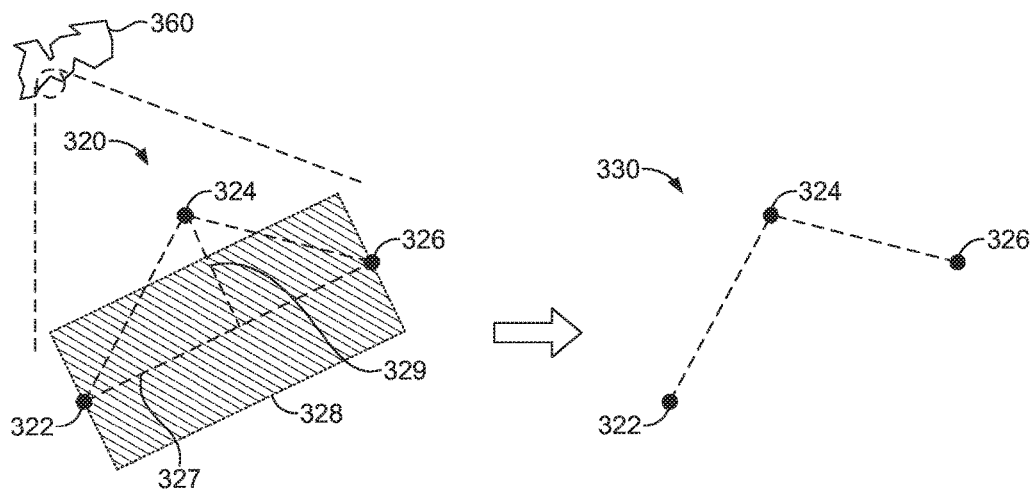

FIGS. 3A and 3B depict exemplary illustrations of aspects of a method of evaluating a candidate point for retention or elimination based on a threshold collinear variance distance, in accordance with an embodiment of the disclosure. FIGS. 3A and 3B show method embodiments of the threshold collinear variance operation acting on different segments of map features consisting of three sequential points. Turning to FIG. 3A, we see a segment of yet another map feature 350. In initial condition 300, the segment consists of a reference point 302, a candidate point 304, and a third point 306. There exists a line 307 which connects the reference point 302 and the third point 306. The threshold collinear variance distance 308 measured perpendicularly from the line 307, as is the actual collinear variance distance 309 to the candidate point 304.

FIG. 3A depicts, in the initial condition 300, the actual collinear variance distance 309 to the candidate point 304 places it within the threshold collinear variance distance 308 of the line 307 connecting the reference point 302 and the third point 306. As a result, in the final condition 310, the candidate point is eliminated 312, while the reference point 302 and the third point 306 are retained.

Turning now to FIG. 3B, we see a segment of yet another map feature 360. In the initial condition 320, the actual collinear variance distance 329 to the candidate point 324 places it outside of the threshold collinear distance 328 from the line 327 between the reference point 322 and the third point 326. Therefore, in the final condition 330, no points are eliminated and the reference point 322, the candidate point 324, and the third point 326 are retained.

Figure 4:
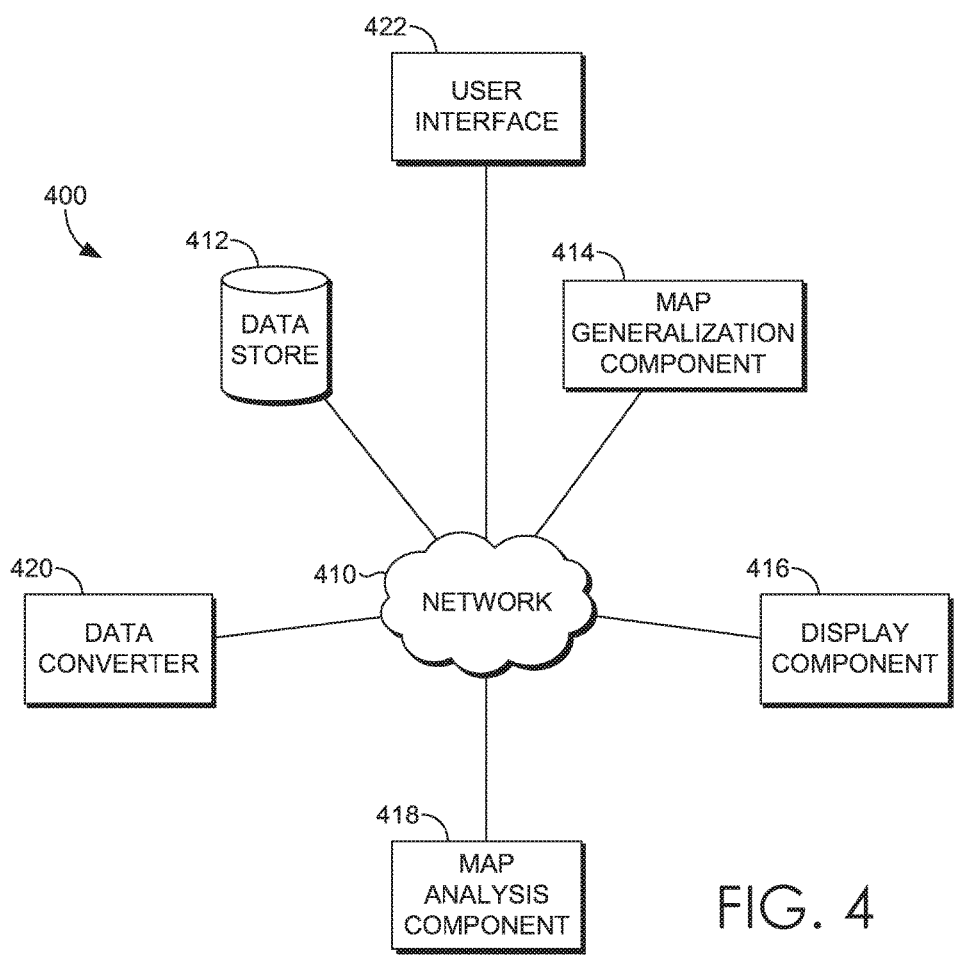
FIG. 4 depicts a block diagram of an exemplary computing environment suitable to implement embodiments of the disclosure.

In FIG. 4, an exemplary computing system environment on which embodiments of the disclosure may be implemented is illustrated and designated generally as reference numeral 400. It will be understood and appreciated by those of ordinary skill in the art that the illustrated computing system environment 400 is merely an example of one suitable computing environment and is not intended to suggest any limitation as to the scope of use or functionality of the invention. Neither should the computing system environment 400 be interpreted as having any dependency or requirements relating to any single component or combination of components illustrated therein.

Embodiments described herein may be operational with numerous other general-purpose or special-purpose computing system environments or configurations. Examples of well-known computing systems, environments, and/or configurations that may be suitable for use with embodiments of the disclosure include, by way of example only, personal computers, server computers, handheld or laptop devices, multiprocessor systems, microprocessor-based systems, set-top boxes, programmable consumer electronics, network PCs, minicomputers, mainframe computers, distributed computing environments that include any of the above-mentioned systems or devices, and the like.

With continued reference to FIG. 4, the exemplary computing system environment 400 includes an exemplary computer network 410, an exemplary data store 412, a map generalization component 414, a display component 416, a map analysis component 418, a data converter 420, and a user interface 422.

Exemplary computer network 410 may include, without limitation, local area networks (LANs) and/or wide area networks (WANs). Such networking environments are commonplace in offices, enterprise-wide computer networks, intranets, and the Internet. In a networked environment, program modules or portions thereof may be stored in data store 412, in the map generalization component 414, the display components 416, the map analysis component 418 or the data converter 420. It will be appreciated by those of ordinary skill in the art that the network connections shown are exemplary and other means of establishing a communications link between the computers (e.g., map generalization component 414, display component 416, map analysis component 418, and data converter 420) may be utilized.

Embodiments described herein may be described in the general context of computer-executable instructions, such as program modules, being executed by a computer, Generally, program modules include, but are not limited to routines, programs, objects, components, and data structures that perform particular tasks or implement particular abstract data types. Embodiments may also be practiced in distributed computing environments where tasks are performed by remote processing devices that are linked through a communication network. In a distributed computing environment, program modules may be located in local and/or remote computer storage media including, by way of example only, memory storage devices.

The map generalization component 414, display component 416, map analysis component 418, and data converter 420 may be general-purpose computing devices programmed with a set of computer-useable instructions to perform particular functions. Components of the these computing devices may include, without limitation, a processing unit, internal system memory, and a suitable system bus for coupling various system components, including a data store 412, with the computing devices.

The computing devices typically include or have access to a variety of computer-readable media, for instance, data store 412. Computer-readable media can be any available media that may be accessed by the computing devices. By way of example, and not limitation, computer-readable media may include computer storage media and communication media.

Map source data is hosted in the data store 412 in a content format that is readable by the map analysis component 418. Map source data may contain various feature classes, examples of which may include polygons, rings, curve segments, paths, lines, and points. In some embodiments, the data store 412 may be contained within a local network, a share drive, a cloud hosted server, etc.

The map analysis component 418 may be configured to perform operations on map data to produce analytical results. By way of example, but not limitation, analytical results may include filtering which license regions are to be displayed, or cross-referencing map data with other data sets, such as user subscriptions or license term expiration dates. The map analysis component 418 may be implementing a GIS software, such as MapInfo.

In some embodiments, the data converter 420 may be configured to receive map source data from the data store 412 and to extract point location data from the map source data. The data converter 420 may be capable of reading the content format of the map source data and sequentially access the features of the input map. Because the ordered sequence by which the data is processed does not matter, the data converter 420 may begin with the polygon which is designated as the first of the set of polygons and may proceed to decompose the polygon into its constituent points. If the first feature in sequence is of a feature class other than a set of spatial points, such as a polygon, object, polyline, or curves segment, the data converter 420 may convert the feature into its constituent point data. In some embodiments, when each element of the first feature is reduced to points, the data converter 420 moves to the next feature in sequence and repeats the process.

With continued reference to FIG. 4, the exemplary computing system environment 400 includes map generalization component 414. The map generalization component 414 may be configured to process maps wherein each feature is stored as a set of point data. The map generalization component 414 may be configured to receive a map from the data converter 420. In some embodiments, this generalization method could be used to reduce the size of a navigation routing file, such as those files provided in a Global Positioning System (GPS) mapping service. Additionally, the map generalization component 414 is configured to generate a second map comprising a set of retained spatial points. In embodiments, the map generalization component 414 begins with the first feature and identifies the first three points in the feature. The first of the three points is used as a reference point. The next point in series is used as a candidate point. If the candidate point in the sequence is within the threshold separation distance from the reference point in the sequence, the candidate point is eliminated. In embodiments, this threshold separation elimination step may be repeated multiple times before a candidate point is identified which is beyond the threshold separation distance from the reference point. Next, a third point is identified, which is a point beyond the candidate point in series. The line connecting the reference point and the third point is identified and the perpendicular distance from that line to the candidate point is measured. If this perpendicular distance is less than the threshold collinear distance, then the candidate point is likewise eliminated.

This process then iterates with a new set of three serial points. If the candidate point is not eliminated, or in other words if the candidate is retained, it is by definition the first retained point, and as such the process iterates with the old candidate point as the new reference point, and the old third point as the new candidate point. If the candidate point is eliminated, the third point is the first retained point, so the reference point remains unchanged and the old third point becomes the new reference point and the next two serial points become the new candidate point and third point, respectively.

This process may iterate until each point in the feature has been evaluated and the process has returned to the first point of the feature. In some embodiments, a condition is imposed such that the first point of the feature is always retained. After this process is completed for the first feature, the process may be repeated for the next feature in series.

In some embodiments of the disclosure, the data converter 420 decomposes each and every map feature into its constituent points prior to initializing the map generalization component 414. In other embodiments, the map generalization component 414 is initialized as soon as the first segment of three points has been decomposed by the data converter 420 or otherwise made available. In such embodiments, the map generalization component 414 would process the points which are available and, upon reaching a feature class other than points, the data converter 420 would be re-initiated.

The user interface 422 may allow a user to select the map source data to be generalized, as well as to select operations to perform on the output map by the analysis component. The user interface 422 may be integrated into a graphic user interface (GUI.) In some embodiments, the user interface 422 allows the user to drag and drop map source data files into an application to initiate the generalization process. The user interface 422 may allow for processing of map data in advance of a user query or when the query is received, in real-time or near real time.

The display component 416 may render the second map and results generated by the analysis component for a user. In various embodiments, the display components 416 and user interface 422 may be incorporated into a mobile device. In some embodiments, the level of resolution or error tolerance which determines the threshold separation distance and threshold collinear variance distance may be calibrated based on the size and resolution of the display component 422.

Figure 5:
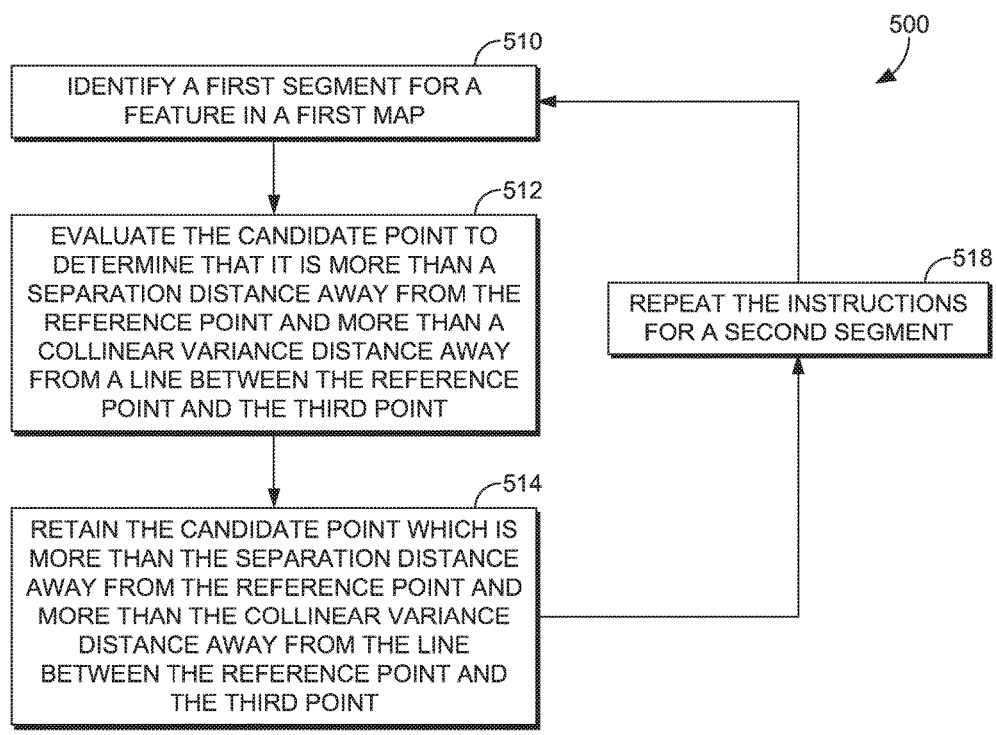
FIG. 5 depicts a flow diagram showing a method of generating a set of retained spatial points, in accordance with an embodiment of the disclosure.

FIG. 5 depicts a flow diagram describing a method 500 for generalizing spatial data, in accordance with an embodiment of the disclosure. The method 500 of FIG. 5 is from the perspective of a computing device, such as the map generalization component 414 of FIG. 4. Initially, in step 510, a first segment for a feature in a first map is identified. The first segment comprises a reference point, a candidate point and a third point in a series, as described in FIGS. 2A and 2B and the accompanying text within this specification. In step 512, the candidate point is evaluated to determine that it is more than a threshold separation distance away from the reference point and more than a threshold collinear variance distance away from a line between the reference point and the third point. As discussed herein, the threshold separation distance is a radial distance centered at the reference point and the threshold collinear variance distance is a distance measured perpendicularly to the line between the reference point and the third point.

In step 514, the candidate point which is more than the separation distance away from the reference point and more than the second threshold collinear variance distance away from the line between the reference point and the third point is retained. In some embodiments, a plurality of potential candidate points may be eliminated in this way, for being within the separation distance from the reference point, before a candidate point is evaluated against the threshold collinear variance distance. In some embodiments, the third point is retained. In some embodiments, the retention of the third point is only temporary, as the third point may become the candidate point and may be eliminated in a subsequent iteration of the method. In some embodiments, method 500 may end after step 514 and not continue to 518. For example, where only three points are to be evaluated. In step 518, the computer-executable instructions comprising steps 510, 512, and 514 may be repeated for a second segment having a reference point, a candidate point, and a third point in a series. In some instances, the reference point for the second segment may be the candidate point of the first segment, if the candidate point of the first segment had been retained. In other instances, the reference point of the second segment may be the same reference point of the first segments, if the candidate point had been eliminated. In some embodiments of the present disclosure, method 500 includes only one iteration. In some embodiments, the method 500 may continue to iterate in this way for each segment in the feature, then for each feature in the first map, until each point in the first map has been evaluated.

Figure 6:
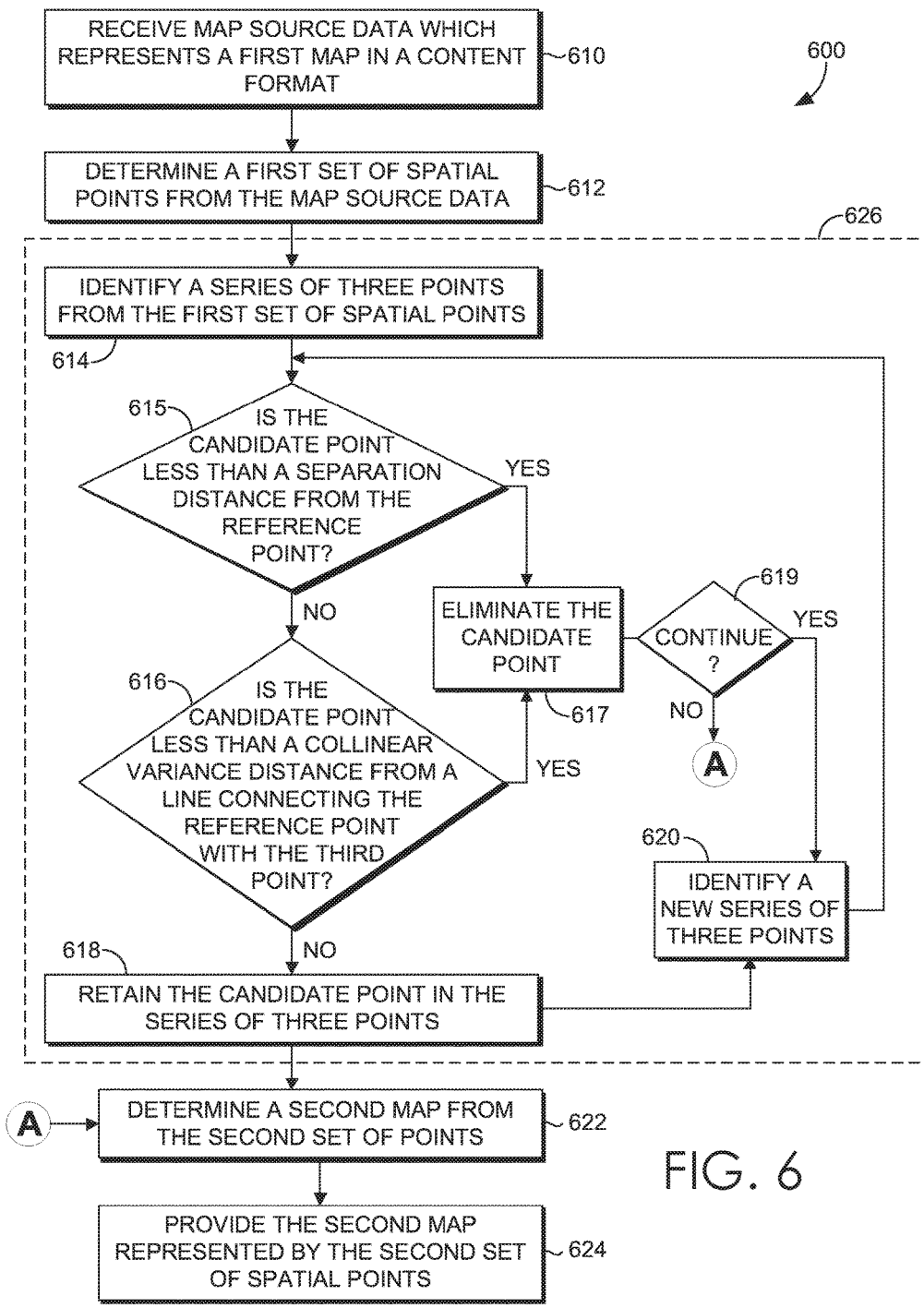
FIG. 6 depicts a flow diagram showing a method of generalizing map data, in accordance with an embodiment of the disclosure.

FIG. 6 depicts a flow diagram describing a method 600 for generalizing spatial data, in accordance with an embodiment of the disclosure. Initially, in step 610, map source data is received which represents a first map in a content format. As mentioned previously, the first map may represent one or more license regions, such as regional licenses for radio frequency spectrum. In step 612, a first set of spatial points is determined from the map source data. In some embodiments, the map source data contains feature classes, such as polygons, rings, curves segments, and lines, which must first be decomposed into a first set of spatial data points. This decomposition into spatial data points may be facilitated by the data converter 420.

At this stage the method enters iterative process 626. The iterative process 626 is from the perspective of a computing device, such as the map generalization component 414. In the first step 614 of iterative process 626, a series of three points is identified from the first set of spatial points. This series of three points comprises a reference point, a candidate point, and a third point. At decision point 615, it is determined whether the candidate point is less than a threshold separation distance from the reference point in the series of three points. If the candidate point is found to be less than the threshold separation distance from the reference point, the iterative process 626 proceeds to step 617. At step 617, the candidate point in the series of three points is eliminated and the process proceeds to step 619.

At step 619, it is determined whether iterative process 626 should continue. In some embodiments, iterative process 626 may be determined to continue until the reference point returns to the first reference point evaluated in the file. In other embodiments, iterative process 626 may be discontinued after one iteration. If it is determined that the iterative process 626 should continue, the process continues to step 620, as discussed below. If not, iterative process 626 proceeds from step 619 to step 622, also discussed below. In some embodiments, this may occur when there is only one set of three points that the iterative process 626 is tasked with evaluating. In other embodiments, this may occur when the iterative process 626 has arrived at the last series of three points that are to be evaluated. In other embodiments, after step 619, iterative process 626 then proceeds to step 620, as discussed below. If at decision point 615 the candidate point is, instead, found not to be less than the threshold separation distance away from the reference point, the iterative process 626 instead proceeds to decision point 616.

At decision point 616, it is determined whether the candidate point is less than a threshold collinear variance distance from a line connecting the reference point with the third point in the series of three points. If the candidate point is found to be less than the threshold collinear variance distance away from the line connecting the reference point and the third point, the iterative process 626 again proceeds to step 617, and the candidate point is eliminated. Iterative process 626 then proceeds to 619, as discussed above. If, on the other hand, the candidate point is found not to be less than the collinear variance distance away from the line connecting the reference point and the third point, the iterative process instead proceeds to step 618. In step 618, the candidate point, having satisfied both the threshold separation and threshold collinear variance test, is retained. In some embodiments, iterative process 626 proceeds from step 618 to step 622 in the first iteration. In other embodiments, iterative process 626 may proceed to step 620 for one or more iterations and subsequently proceed from step 618 to step 622. It will be understood and appreciated by those of ordinary skill in the art that the order of decision point 615 and decision point 616 could be swapped without detrimental impact to the method.

As discussed above, in some embodiments, the iterative process proceeds to step 620, wherein a new series of three points is identified. The new series of three points comprises a new reference point, a new candidate point, and a new third point. Either the reference point or the candidate point for the immediately preceding iteration becomes the new reference point for the new series of three points. The determining factor as to which point becomes the new reference point is whether the candidate point is eliminated or retained in the immediately preceding iteration. That is to say the candidate point becomes the new reference point if it has been retained, otherwise the old reference point remains as the new reference point. The process continues with step 615 for the new series of three points, wherein the new candidate point is eliminated if it is within the threshold distances, as discussed before. This iterative process can be repeated any number of times. In some embodiments, only one iteration is performed. In other embodiments, this iterative process repeats until it returns to the reference point of the first iteration of the process. In some embodiments, upon returning to the first reference point, the iterative process continues for a plurality of other map features stored in the map source data.

After performing one or more iterations, the method continues to step 622. At step 622, after completing the iterative process, a second map is determined from the second set of points. As a result of this process, the second map may have fewer spatial data points than the first map. At step 624, the second map, represented by the second set of spatial points, is provided. In some embodiments, the second map is provided directly to the display component 416. In other embodiments, the second map is provided to the map analysis component 418 prior to display.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. For example, rather than only applying to spatial data files representing or relating to license territories, embodiments of this disclosure could be applied any spatial data files. Alternative means of implementing the aforementioned can be completed without departing from the scope of the claims below. Certain features and subcombinations are of utility and may be employed without reference to other features and subcombinations and are contemplated within the scope of the claims.

What is claimed is:

1. A method of generalizing map data comprising:
  receiving map source data which represents a first map in a content format;
  determining a first set of spatial points from the map source data;
  generating a second set of spatial points from the map source data,
  wherein the second set of spatial points is generated by an iterative process comprising at least a first iteration and a second iteration, the first and second iterations each comprising a set of steps, the steps of the first iteration comprising:

a) first, identifying a series of three points from the first set of spatial points, the series of three points comprising a reference point, a candidate point, and a third point;
b) second, determining a first distance between the candidate point and the reference point;
c) third, in response to the first distance being greater than a threshold separation distance, determining a second distance, wherein the second distance is a distance between the candidate point and a line connecting the reference point and the third point in the series; and
d) fourth, in response to the second distance being less than a threshold collinear variance distance, eliminating the candidate point in the series of three points determining a second map from the second set of spatial points;
wherein steps of the second iteration are identical to the steps of the first iteration but are applied to a new series of three points from the first set of spatial points, the new series of three points comprising a new reference point, a new candidate point, and a new third point, wherein either the reference point or the candidate point of the first iteration becomes the new reference point for the new series of three points; and
providing the second map represented by the second set of spatial points.

2. The method of claim 1, wherein the second map comprises fewer spatial data points than the first map.

3. The method of claim 1, wherein determining the first set of spatial points comprises converting the map source data from a feature class other than a set of spatial points into an initial set of spatial points.

4. The method of claim 3, wherein the feature class other than the set of spatial points is as a set of polygons.

5. The method of claim 1, wherein the second map is determined to be the same content format as the first map.

6. The method of claim 1, wherein the first map represents one or more license regions based on at least one license for at least one radio frequency.

7. The method of claim 1, wherein the content format of the first map comprises a MapInfo file.

8. One or more non-transitory computer-readable media comprising a set of computer-executable instructions that when executed, facilitates a method of generating a set of retained spatial points, the method comprising:
an iterative process comprising a plurality of iterations, wherein a first iteration include a set of steps, comprising:
identifying a first segment for a feature in a first map, wherein the first segment comprises a reference point, a candidate point and a third point in a series;
evaluating the candidate point to determine that the candidate point is more than a threshold separation distance away from the reference point, wherein the threshold separation distance is a radial distance centered at the reference point;
upon determining that the candidate point is more than the threshold separation distance away from the reference point, evaluating the candidate point to determine that the candidate point is more than a threshold collinear variance distance away from a line between the reference point and the third point, wherein the threshold collinear variance distance is a distance measured perpendicularly to the line between the reference point and the third point; and
retaining the candidate point in response to determining that the candidate point is more than the threshold separation distance away from the reference point and more than the threshold collinear variance distance away from the line between the reference point and the third point; and
wherein a second iteration repeats the steps of the first iteration for a second segment having a new reference point, a new candidate point, and a new third point.

9. The media of claim 8, wherein the threshold separation distance and the threshold collinear variance distance are assigned based on a resolution of an output map.

10. The media of claim 8, wherein the threshold separation distance and the threshold collinear variance distance are the same quantity.

11. A computerized system comprising:
a data store storing map source data;
a map generalization component comprising one or more processors configured to receive a first map and further configured to generate a second map comprising a set of retained spatial points; and
computer storage memory having computer-executable instructions stored thereon which, when executed by the one or more processors, implement a method of generating a set of retained spatial points, the method comprising:
a set of iterative instructions comprising:
selecting a first point as a reference point,
identifying a first set of candidate spatial points that are more than a threshold separation distance away from the reference;
upon identifying the first set of candidate spatial points, identifying a second set of candidate spatial points, wherein the second set of candidate spatial points in a subset of the first set of candidate spatial points, and wherein the second set of candidate spatial points are found within a threshold collinear variance distance of a line connecting the reference point to a third point;
eliminating the second set of candidate spatial points,
wherein the set of iterative instructions are repeated for a plurality of iterations, wherein the reference point for a subsequent iterations is a new point;
wherein the threshold separation distance is a radial distance centered at the reference point and the threshold collinear variance distance is a distance measured perpendicular to the line between the reference point and the third point, and
determining the set of retained spatial points, the set of retained spatial points corresponding to candidate points that have not been eliminated.

12. The system of claim 11, further comprising a data converter comprising one or more processors configured to receive the map source data from the data store and further configured to extract point location data from the map source data, wherein the map source data is stored in a feature class other than point location data.

13. The system of claim 11, further comprising a map analysis component comprising one or more processors configured to perform operations on the second map to produce analytical results.

14. The system of claim 13, further comprising a display component comprising one or more processors configured to render the second map and the analytical results for a user.

15. The system of claim 14, wherein the display component is a mobile device.

16. The system of claim 14, wherein the threshold separation distance and the threshold collinear variance distance are based on a resolution of the display component.

17. The system of claim 11 further comprising a user interface, wherein the user interface is configured as a drag-and-drop interface with the map source data.

18. The system of claim 11 further comprising a user interface, wherein the user interface is configured for processing of map data when a query is received.

* * * * *